United States Patent
Hamasuna et al.

(10) Patent No.: US 11,226,644 B2
(45) Date of Patent: Jan. 18, 2022

(54) VOLTAGE CONVERTING DEVICE

(71) Applicant: HONDA MOTOR CO., LTD., Tokyo (JP)

(72) Inventors: Ryoma Hamasuna, Wako (JP); Takeshi Sakurai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/108,003

(22) Filed: Dec. 1, 2020

(65) Prior Publication Data
US 2021/0191436 A1    Jun. 24, 2021

(30) Foreign Application Priority Data

Dec. 24, 2019 (JP) .............................. JP2019-233089

(51) Int. Cl.
*H01M 10/44* (2006.01)
*G05F 1/46* (2006.01)
*H02J 7/00* (2006.01)

(52) U.S. Cl.
CPC .............. *G05F 1/46* (2013.01); *H02J 7/0068* (2013.01)

(58) Field of Classification Search
CPC . G05F 1/46; H02J 7/35; H02M 3/156; H02M 3/1588; H02M 3/1584; H02M 3/158; Y02B 70/1466
USPC .......................................... 320/101; 323/282
See application file for complete search history.

(56) References Cited

U.S. PATENT DOCUMENTS

| 10,715,032 | B2 * | 7/2020 | Vervaart ................. H02M 1/36 |
| 2008/0029153 | A1 * | 2/2008 | Margalit ............... H02J 7/0047 |
| | | | 136/252 |
| 2014/0009106 | A1 * | 1/2014 | Andrea ................. H02J 7/0018 |
| | | | 320/107 |

(Continued)

FOREIGN PATENT DOCUMENTS

| JP | 2007-008403 | 1/2007 |
| JP | 2009-153251 | 7/2009 |

(Continued)

OTHER PUBLICATIONS

Japanese Office Action for Japanese Patent Application No. 2019-233089 dated Aug. 24, 2021.

*Primary Examiner* — Quan Tra
(74) *Attorney, Agent, or Firm* — Amin, Turocy & Watson, LLP

(57) ABSTRACT

A voltage converting device includes: a DC/DC converter configured to step down a voltage of a power supply and output the stepped-down voltage to a low-voltage power supply having a voltage lower than a voltage of the power supply; a control device configured to control the DC/DC converter; and a determining unit configured to determine whether a voltage of the power supply input to the DC/DC converter is within a predetermined voltage range, wherein the control device switches, on the basis of a determination result of the determining unit, between a first control in which the DC/DC converter is caused to perform a step-down operation and electric power is supplied to a load connected to the low-voltage power supply and a second control in which a step-down operation of the DC/DC converter stops and electric power is supplied from the low-voltage power supply to the load.

8 Claims, 4 Drawing Sheets

(56) References Cited

U.S. PATENT DOCUMENTS

| | | | | |
|---|---|---|---|---|
| 2014/0104904 | A1* | 4/2014 | Lin | H02M 3/073 |
| | | | | 363/61 |
| 2016/0329730 | A1* | 11/2016 | Shiu | H02J 7/00 |
| 2017/0237346 | A1* | 8/2017 | Toyama | H02M 1/08 |
| | | | | 323/271 |
| 2019/0339728 | A1* | 11/2019 | Nabeto | H02M 1/36 |

FOREIGN PATENT DOCUMENTS

| | | |
|---|---|---|
| JP | 2009-189208 | 8/2009 |
| JP | 2009-213223 | 9/2009 |
| JP | 2014-057465 | 3/2014 |
| JP | 2016-119751 | 6/2016 |
| JP | 2019-205275 | 11/2019 |

* cited by examiner

| OPERATION MODE | DC/DC CONVERTER | LOW-VOLTAGE POWER SUPPLY | LOAD |
|---|---|---|---|
| FIRST OPERATION MODE | STEP-DOWN OPERATION | LESS THAN OR EQUAL TO PREDETERMINED VALUE | — |
| SECOND OPERATION MODE | STEP-DOWN OPERATION | — | LARGE LOAD |
| THIRD OPERATION MODE | STOPPING OF STEP-DOWN OPERATION | LARGER THAN PREDETERMINED VALUE | SMALL LOAD |

VOLTAGE CONVERTING DEVICE

CROSS-REFERENCE TO RELATED APPLICATION

Priority is claimed on Japanese Patent Application No. 2019-233089, filed Dec. 24, 2019, the content of which is incorporated herein by reference.

BACKGROUND OF THE INVENTION

Field of the Invention

The present invention relates to a voltage converting device.

Description of Related Art

In the related art, vehicles which include a high-voltage battery, a low-voltage battery, an auxiliary machine, and a direct current (DC)/DC converter configured to perform a step-down operation are known (for example, refer to Japanese Unexamined Patent Application, First Publication No. 2007-008403 (hereinafter referred to as "Patent Document 1")). Patent Document 1 describes that a DC/DC converter steps down a high voltage to a specified voltage (for example, 12 V) of a low-voltage battery.

SUMMARY OF THE INVENTION

Patent Document 1 does not describe the details of a step-down operation of the DC/DC converter. Since electric power output from the DC/DC converter is used in, for example, a load such as an auxiliary machine, the step-down operation of the DC/DC converter needs to be appropriately controlled on the basis of a voltage or the like input to the DC/DC converter.

The inventors of the present invention have found in diligent research that there is a concern concerning that a voltage higher than a normal working voltage in, for example, a load such as an auxiliary machine would be supplied from the DC/DC converter to the load when a high voltage is input to the DC/DC converter and a small current would be output from the DC/DC converter.

An object of an aspect according to the present invention is to provide a voltage converting device in which a step-down operation of a DC/DC converter is able to be appropriately controlled.

To be specific, an object of an aspect according to the present invention is to provide a voltage converting device in which a concern concerning a voltage higher than a normal working voltage in a load which is supplied from a DC/DC converter to a load is minimized.

In order to solve the problems and achieve the associated objects, the present invention adopts the following aspect.

(1) A voltage converting device according to an aspect of the present invention includes: a DC/DC converter configured to step down a voltage of a power supply and output the stepped-down voltage to a low-voltage power supply having a voltage lower than a voltage of the power supply; a control device configured to control the DC/DC converter; and a determining unit configured to determine whether a voltage of the power supply input to the DC/DC converter is within a predetermined voltage range, wherein the control device switches, on the basis of at least a determination result of the determining unit, between a first control in which the DC/DC converter is caused to perform a step-down operation and electric power is supplied to a load connected to the low-voltage power supply and a second control in which a step-down operation of the DC/DC converter stops and electric power is supplied from the low-voltage power supply to the load.

(2) In the aspect of (1), the control device may perform the first control when the determining unit determines that the voltage of the power supply is within the predetermined voltage range and perform the second control when the determining unit determines that the voltage of the power supply is outside of the predetermined voltage range.

(3) In the aspect of (1), the voltage converting device includes: the load connected to the low-voltage power supply, wherein the control device may switch between the first control and the second control on the basis of a load current supplied to the load.

(4) In the aspect of (3), the control device may perform the first control, even when it is determined that the voltage of the power supply input to the DC/DC converter is outside of the predetermined voltage range, when the load current supplied to the load is larger than or equal to a threshold value.

(5) In the aspect of (1), the control device may perform the first control and perform charging of the low-voltage power supply when the determining unit determines that the voltage of the power supply is outside of the predetermined voltage range and when a charging rate of the low-voltage power supply is less than or equal to a predetermined value, and the control device may perform the second control when the determining unit determines that the voltage of the power supply is outside of the predetermined voltage range and when the charging rate of the low-voltage power supply is larger than the predetermined value.

(6) In the aspect of (4), the control device may perform the second control when the voltage of the power supply input to the DC/DC converter is outside of the predetermined voltage range and when a load current supplied to the load is less than the threshold value and a charging rate of the low-voltage power supply is larger than a predetermined value.

(7) In the aspect of (6), the control device may not perform the first control when a charging rate of the power supply is less than a specified value.

(8) In the aspect of (7), a case in which the charging rate of the power supply is less than the specified value may include a case in which the charging rate of the power supply is less than the specified value if the DC/DC converter is caused to perform a step-down operation and electric power output from the DC/DC converter is supplied to the load.

(9) In the aspect of (7) or (8), a case in which the charging rate of the power supply is less than the specified value may include a case in which the charging rate of the power supply is less than the specified value if the DC/DC converter is caused to perform a step-down operation and electric power output from the DC/DC converter is supplied to the low-voltage power supply.

In the aspects of (1) and (2), a determination regarding whether the voltage of the power supply input to the DC/DC converter is within the predetermined voltage range is performed and switching is performed, at least on the basis of the determination result, between the first control in which the DC/DC converter is caused to perform the step-down operation and electric power is supplied from the DC/DC converter to the load connected to the low-voltage power supply and the second control in which the step-down operation of the DC/DC converter stops and electric power is supplied from the low-voltage power supply to the load.

When the voltage of the power supply input to the DC/DC converter is outside of the predetermined voltage range, the second control in which the step-down operation of the DC/DC converter stops and electric power is supplied from the low-voltage power supply to the load may be performed.

In a case in which a constitution is provided in this way, for example, when there is a concern concerning a voltage higher than the normal working voltage in the load which is output from the DC/DC converter and supplied to the load, electric power is not supplied from the DC/DC converter to the load and electric power is supplied from the low-voltage power supply to the load.

For this reason, in the aspects of (1) and (2), it is possible to minimize a concern concerning a voltage higher than the normal working voltage in the load which is supplied from the DC/DC converter to the load and it is possible to appropriately control a step-down operation of the DC/DC converter.

The inventors of the present invention have found in diligent research that, when the load current supplied to the load is larger than or equal to the threshold value, even if the voltage of the power supply input to the DC/DC converter is higher than or equal to the upper limit value, a voltage supplied from the DC/DC converter to the load is not higher than the normal working voltage in the load.

Thus, in the aspects of (3) and (4), on the basis of the load current supplied to the load, switching may be performed between the first control in which the DC/DC converter is caused to perform the step-down operation and electric power is supplied from the DC/DC converter to the load connected to the low-voltage power supply and the second control in which the step-down operation of the DC/DC converter stops and electric power is supplied from the low-voltage power supply to the load. Even when the voltage of the power supply input to the DC/DC converter is outside of the predetermined voltage range, when the load current supplied to the load is larger than or equal to the threshold value, the first control in which the DC/DC converter is caused to perform the step-down operation and electric power is supplied from the DC/DC converter to the load connected to the low-voltage power supply may be performed.

In a case in which a constitution is provided in this way, even when the voltage of the power supply input to the DC/DC converter is outside of the predetermined voltage range, it is possible to minimize a concern concerning a voltage higher than the normal working voltage in the load which is supplied from the DC/DC converter to the load.

The inventors of the present invention have found in the diligent research that, when the low-voltage power supply is charged, even if the voltage of the power supply input to the DC/DC converter is higher than or equal to the upper limit value, the voltage supplied from the DC/DC converter to the load is not higher than the normal working voltage in the load.

Thus, in the aspect of (5), when the voltage of the power supply input to the DC/DC converter is outside of the predetermined voltage range and when the charging rate of the low-voltage power supply is less than or equal to the predetermined value, the first control in which electric power is supplied from the DC/DC converter to the load connected to the low-voltage power supply may be performed and the low-voltage power supply may be charged.

In a case in which a constitution is provided in this way, even when the voltage of the power supply input to the DC/DC converter is outside of the predetermined voltage range, it is possible to minimize a concern concerning a voltage higher than the normal working voltage in the load which is supplied from the DC/DC converter to the load.

In the aspect of (6), even when the voltage of the power supply input to the DC/DC converter is outside of the predetermined voltage range, when the load current supplied to the load is less than the threshold value and the charging rate of the low-voltage power supply is larger than the predetermined value, the second control in which the step-down operation of the DC/DC converter stops and electric power is supplied from the low-voltage power supply to the load may be performed.

In a case in which a constitution is provided in this way, it is possible to minimize the likelihood of electric power being supplied from the low-voltage power supply to the load while it is possible to minimize a concern concerning a voltage higher than the normal working voltage in the load which is supplied from the DC/DC converter to the load.

In the aspects of (7) to (9), when the charging rate of the power supply is less than the specified value, the first control in which the DC/DC converter is caused to perform the step-down operation and electric power is supplied from the DC/DC converter to the load connected to the low-voltage power supply may not be performed.

In a case in which a constitution is provided in this way, it is possible to minimize a concern concerning a voltage of the power supply which falls below the discharge cutoff voltage.

BRIEF DESCRIPTION OF THE DRAWINGS

FIG. 5 is a diagram illustrating an example of a relationship between a current supplied to a load used all the time in a vehicle having the voltage converting device in the first embodiment applied thereto, a charging current supplied from the DC/DC converter to a low-voltage power supply when the low-voltage power supply of the vehicle is charged, and the like.

DETAILED DESCRIPTION OF THE INVENTION

Embodiments of a voltage converting device according to the present invention will be described below with reference to the accompanying drawings.

First Embodiment

Figure 1:
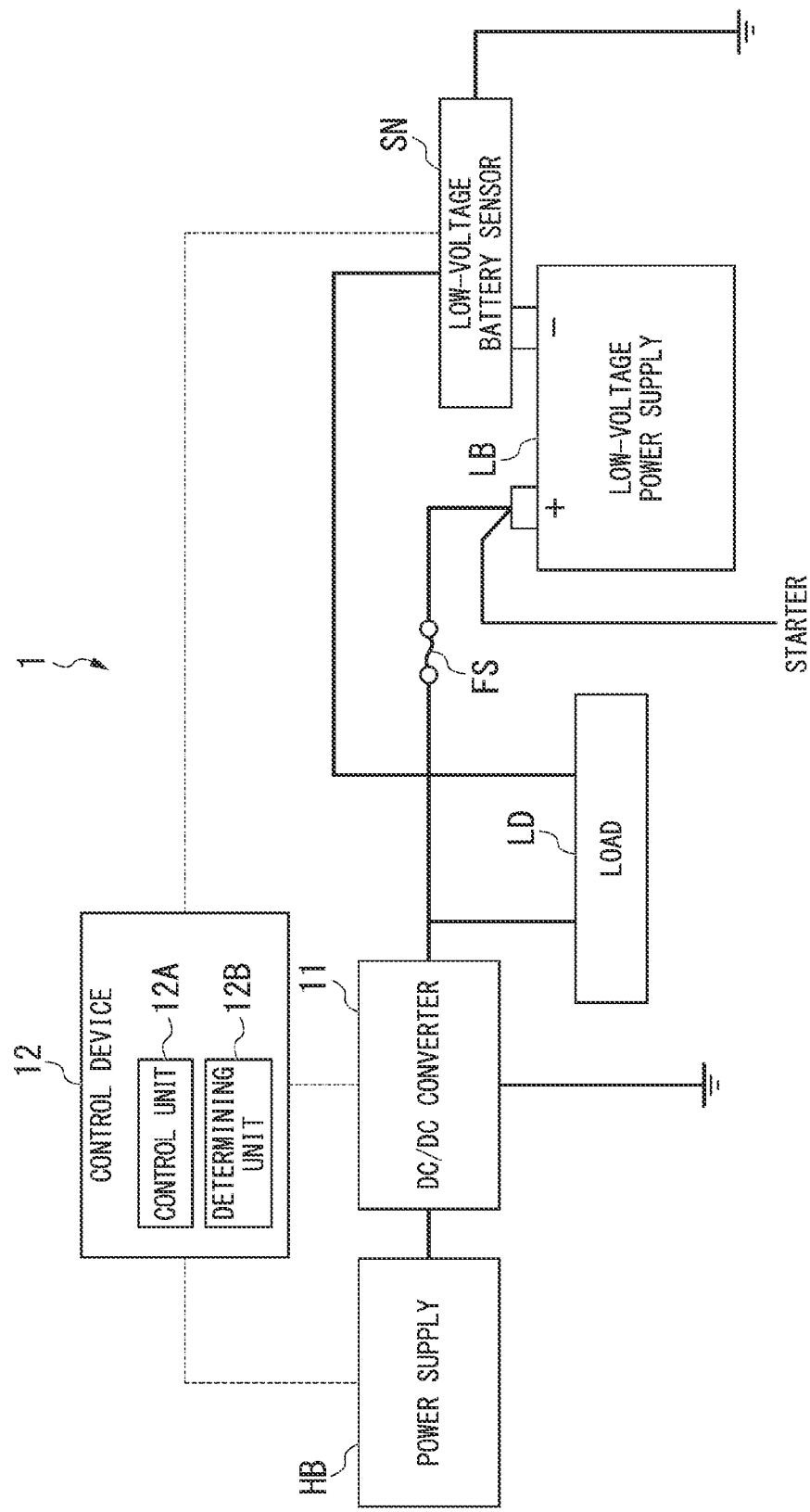
FIG. 1 is a diagram illustrating an example of a schematic constitution of a voltage converting device in a first embodiment.

FIG. 1 is a diagram illustrating an example of a schematic constitution of a voltage converting device 1 in a first embodiment.

In the example illustrated in FIG. 1, the voltage converting device 1 includes a direct current (DC)/DC converter 11, and a control device 12 configured to control the DC/DC converter 11.

The DC/DC converter 11 is connected to a power supply HB functioning as a high-voltage battery, the control device 12, and one end of a load LD. The DC/DC converter 11 is grounded. Furthermore, the DC/DC converter 11 is connected to a positive electrode terminal of a low-voltage power supply LB functioning as a low-voltage battery with a fuse FS therebetween. The other end of the load LD is connected to a negative electrode terminal of the low-voltage power supply LB. The negative electrode terminal of the low-voltage power supply LB is grounded. The positive electrode terminal of the low-voltage power supply LB is connected to a starter.

Although the positive electrode terminal of the low-voltage power supply LB is connected to the starter in the example illustrated in FIG. 1, the starter may not be provided in the other examples.

In the example illustrated in FIG. 1, the voltage converting device 1 is applied to the vehicle and the load LD functions as a vehicle body electrical load. In the other examples, the voltage converting device 1 may be applied to something other than the vehicle and the load LD may function as a load other than the vehicle body electrical load.

In the example illustrated in FIG. 1, a current and a voltage of the power supply HB are detected by a high-voltage battery sensor (not shown) and the current and the voltage of the power supply HB are used in the control device 12 to control the DC/DC converter 11. A current and a voltage of the low-voltage power supply LB are detected by a low-voltage battery sensor SN and the current and the voltage of the low-voltage power supply LB are used in the control device 12 to control the DC/DC converter 11.

The DC/DC converter 11 steps down the voltage of the power supply HB and outputs the stepped-down voltage to the low-voltage power supply LB having a voltage lower than the voltage of the power supply HB.

The control device 12 includes a control unit 12A and a determining unit 12B. The determining unit 12B determines whether a voltage of the power supply HB input to the DC/DC converter 11 is within a voltage range AR1 (refer to FIG. 3). The control unit 12A switches between first control in which the DC/DC converter 11 is caused to perform a step-down operation and electric power is supplied to the load LD and second control in which a step-down operation of the DC/DC converter 11 stops and electric power is supplied from the low-voltage power supply LB to the load LD on the basis of the determination result through the determining unit 12B.

Figure 2:
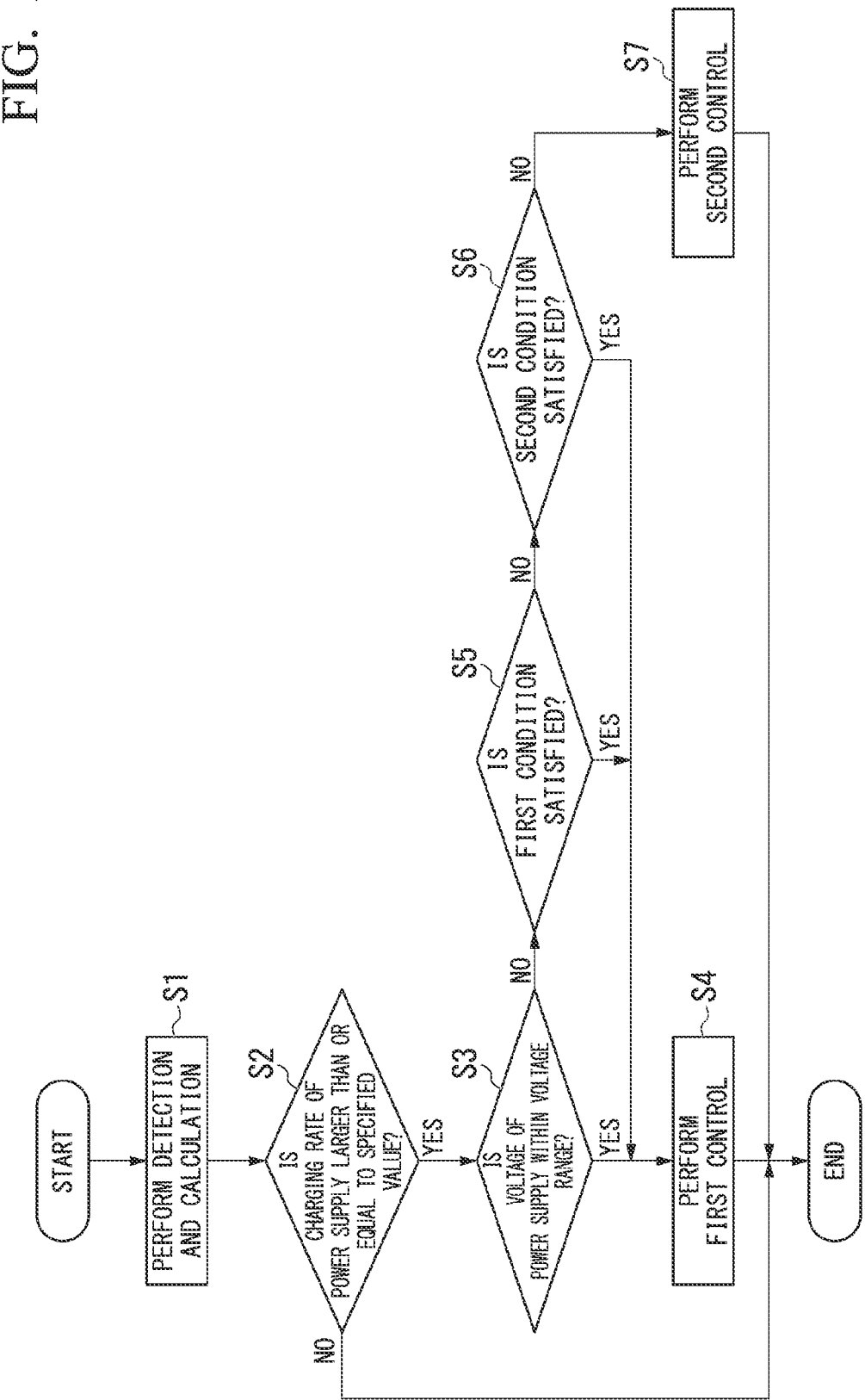
FIG. 2 is a flowchart for explaining an example of a process performed in the voltage converting device in the first embodiment.

FIG. 2 is a flowchart for explaining an example of a process performed in the voltage converting device 1 in the first embodiment.

In the example illustrated in FIG. 2, in Step S1, the high-voltage battery sensor detects a current and a voltage of the power supply HB, the low-voltage battery sensor SN detects a current and a voltage of the low-voltage power supply LB, and the control device 12 calculates a charging rate (SOC: a state of charge) of the power supply HB, a charging rate (SOC) of the low-voltage power supply LB, and a load current supplied to the load LD on the basis of the detection results of the high-voltage battery sensor and the low-voltage battery sensor SN.

Subsequently, in Step S2, the determining unit 12B of the control device 12 determines whether the charging rate of the power supply HB calculated in Step S1 is higher than or equal to a specified value. When it is determined that the charging rate of the power supply HB is higher than or equal to a specified value, the process proceeds to the processing of Step S3. On the other hand, when the charging rate of the power supply HB is less than a specified value, the routine illustrated in FIG. 2 ends without performing the first control.

In the example illustrated in FIG. 2, a lower limit value of the voltage of the power supply HB is set in consideration of the fact that the power supply HB cannot be charged and discharged if a voltage of the power supply HB falls below a discharge cutoff voltage. Furthermore, in order to prevent the voltage of the power supply HB from falling below the lower limit value thereof, the above-described specified value of the charging rate of the power supply HB is set.

For this reason, in the example illustrated in FIG. 2, if the DC/DC converter 11 is caused to perform the step-down operation and electric power output from the DC/DC converter 11 is supplied to the load LD, when the charging rate of the power supply HB is less than the specified value, a determination made in Step S2 is also NO.

In the example illustrated in FIG. 2, if the DC/DC converter 11 is caused to perform the step-down operation and electric power output from the DC/DC converter 11 is supplied to the low-voltage power supply LB, when the charging rate of the power supply HB is less than the specified value, a determination made in Step S2 is also NO.

In Step S3, the determining unit 12B of the control device 12 determines whether a voltage of the power supply HB input to the DC/DC converter 11 is within the voltage range AR1 (refer to FIG. 3) on the basis of the voltage or the like of the power supply HB detected in Step S1. When it is determined that the voltage of the power supply HB input to the DC/DC converter 11 is within the voltage range AR1, the process proceeds to the processing of Step S4. On the other hand, when the voltage of the power supply HB input to the DC/DC converter 11 is outside of the voltage range AR1, for example, in a case in which the voltage of the power supply HB input to the DC/DC converter 11 is within the voltage range AR2 (refer to FIG. 3), the process proceeds to the processing of Step S5.

Figures 3, 4:
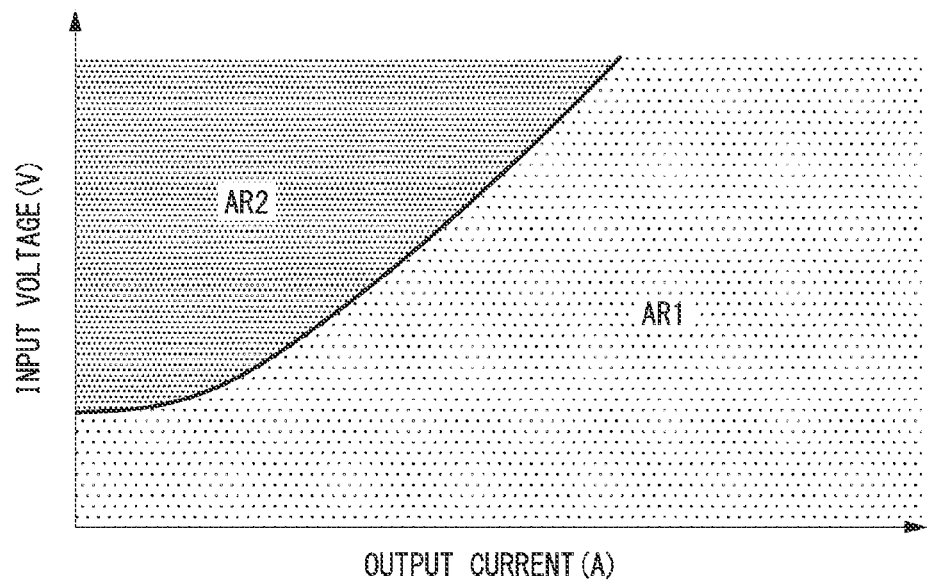
FIG. 3 is a diagram for explaining voltage ranges used in Step S3 in FIG. 2.
FIG. 4 is a diagram for explaining an example of an operation mode of a direct current (DC)/DC converter of the voltage converting device in the first embodiment.

FIG. 3 is a diagram for explaining the voltage ranges AR1 and AR2 used in Step S3 in FIG. 2.

In FIG. 3, a vertical axis indicates a voltage [V] input to the DC/DC converter 11 and a horizontal axis indicates a current [A] output from the DC/DC converter 11. The inventors of the present invention have found in the diligent research that there is a concern concerning a voltage higher than a normal working voltage in, for example, a load LD such as an auxiliary machine (for example, a voltage higher than 14.5 [V]) which is supplied from the DC/DC converter 11 to the load LD in the voltage range AR2 in FIG. 3 in which a high voltage is input to the DC/DC converter 11 and a small current is output from the DC/DC converter 11 and a voltage within the range of the normal working voltage in the load LD (for example, a voltage, i.e., 14.5 [V]) is supplied from the DC/DC converter 11 to the load LD in the voltage range AR1 in FIG. 3.

To be specific, as illustrated in FIG. 3, the inventors of the present invention have found that, when a large current is output from the DC/DC converter 11, an upper limit value of the voltage range AR1 (that is, an upper limit value of a voltage required for a voltage input to the DC/DC converter 11 to be within the voltage range AR1) is large, and when a small current is output from the DC/DC converter 11, the upper limit value of the voltage range AR1 is small, and as a small current is output from the DC/DC converter 11, the upper limit value of the voltage range AR1 decreases.

In Step S4 in FIG. 2, the control unit 12A of the control device 12 performs the first control in which the DC/DC converter 11 is caused to perform a step-down operation and electric power is supplied from the DC/DC converter 11 to the load LD.

The inventors of the present invention have found in the diligent research that, when a load current supplied from the DC/DC converter 11 to the load LD is larger than or equal to a threshold value, even if a voltage of the power supply HB input to the DC/DC converter 11 is higher than or equal to the upper limit value of the voltage range AR1 (that is, even when a voltage of the power supply HB input to the DC/DC converter 11 is within the voltage range AR2), a voltage supplied from the DC/DC converter 11 to the load LD is not a voltage higher than the normal working voltage in the load LD (for example, a voltage higher than 14.5 [V]).

Thus, in Step S5 of FIG. 2, the determining unit 12B of the control device 12 determines whether a load current supplied from the DC/DC converter 11 to the load LD is larger than or equal to a threshold value and satisfies a first condition which is a condition in which a voltage supplied from the DC/DC converter 11 to the load LD is not a voltage higher than the normal working voltage in the load LD. When it is determined that the first condition is satisfied, the process proceeds to the process of Step S4. In addition, in Step S4, the control unit 12A of the control device 12 performs the first control in which the DC/DC converter 11 is caused to perform a step-down operation and electric power is supplied from the DC/DC converter 11 to the load LD. On the other hand, when it is determined that the first condition is not satisfied, the process proceeds to the process of Step S6.

For example, in the example in which the voltage converting device 1 in the first embodiment is applied to the vehicle, as a threshold value of a load current, for example, a value or the like of a load current supplied to a load used all the time in the vehicle is set.

Also, the inventors of the present invention have found in the diligent research that, when the low-voltage power supply LB is charged with electric power supplied from the DC/DC converter 11 to the low-voltage power supply LB, even if a voltage of the power supply HB input to the DC/DC converter 11 is higher than or equal to the upper limit value of the voltage range AR1 (that is, even when a voltage of the power supply HB input to the DC/DC converter 11 is within the voltage range AR2), a voltage supplied from the DC/DC converter 11 to the load LD is not a voltage higher than the normal working voltage in the load LD (for example, a voltage higher than 14.5 [V]).

Thus, in Step S6 of FIG. 2, the determining unit 12B of the control device 12 determines whether the charging rate of the low-voltage power supply LB is less than or equal to a predetermined value, the low-voltage power supply LB is charged with electric power supplied from the DC/DC converter 11 to the low-voltage power supply LB, and satisfies a second condition which is a condition in which a voltage supplied from the DC/DC converter 11 to the load LD is not a voltage higher than the normal working voltage in the load LD. When it is determined that the second condition is satisfied, the process proceeds to the process of Step S4. In addition, in Step S4, the control unit 12A of the control device 12 performs the first control in which the DC/DC converter 11 is caused to perform a step-down operation and electric power is supplied from the DC/DC converter 11 to the load LD, causes electric power to be supplied from the DC/DC converter 11 to the low-voltage power supply LB, and causes the low-voltage power supply LB to be subjected to charging. On the other hand, when it is determined that the second condition is not satisfied, the process proceeds to the process of Step S7.

In Step S7, the control unit 12A of the control device 12 stops a step-down operation of the DC/DC converter 11 and performs the second control in which electric power is supplied from the low-voltage power supply LB to the load LD.

That is to say, in the example illustrated in FIG. 2, when a voltage of the power supply HB input to the DC/DC converter 11 is outside of the voltage range AR1, a determination in Step S3 is NO. In addition, even if a load current supplied from the DC/DC converter 11 to the load LD is larger than or equal to a threshold value, when a condition which is not appropriate for the first control is provided, a determination in Step S5 is NO. Furthermore, when the charging rate of the low-voltage power supply LB is larger than a predetermined value, a determination in Step S6 is NO. In addition, in Step S7, the control unit 12A of the control device 12 performs the second control.

For example, in the example in which the voltage converting device 1 in the first embodiment is applied to the vehicle, in Step S6 in FIG. 2, the determining unit 12B of the control device 12 determines whether the second condition which is a condition in which a voltage supplied from the DC/DC converter 11 to the load LD is not a voltage higher than the normal working voltage in the load LD is satisfied when a current is supplied from the DC/DC converter 11 to the load LD used all the time in the vehicle and the low-voltage power supply LB is charged with electric power supplied from the DC/DC converter 11 to the low-voltage power supply LB. When the second condition is not satisfied, that is, even if a current is supplied from the DC/DC converter 11 to the load LD used all the time in the vehicle and the low-voltage power supply LB is charged with electric power supplied from the DC/DC converter 11 to the low-voltage power supply LB, when a voltage supplied from the DC/DC converter 11 to the load LD is higher than the normal working voltage in the load LD, in Step S7 of FIG. 2, the control unit 12A of the control device 12 stops a step-down operation of the DC/DC converter 11.

FIG. 4 is a diagram for explaining an example of an operation mode of the DC/DC converter 11 of the voltage converting device 1 in the first embodiment.

In the example illustrated in FIG. 4, the operation mode of the DC/DC converter 11 includes a first operation mode, a second operation mode, and a third operation mode.

In the first operation mode, the DC/DC converter 11 performs a step-down operation in which a voltage of the power supply HB is stepped down and the stepped-down voltage is output to the low-voltage power supply LB having a voltage lower than the voltage of the power supply HB. In the first operation mode, the charging rate of the low-voltage power supply LB is less than or equal to the above-described predetermined value. In Step S4 performed after a determination in Step S6 of FIG. 2 is YES, a step-down operation of the DC/DC converter 11 in the first operation mode is performed and the low-voltage power supply LB is charged with electric power supplied from the DC/DC converter 11.

In the second operation mode, the DC/DC converter 11 performs a step-down operation in which a voltage of the power supply HB is stepped down and the stepped-down voltage is output to the low-voltage power supply LB having a voltage lower than the voltage of the power supply HB. In the second operation mode, a load current supplied from the DC/DC converter 11 to the load LD is larger than or equal to the above-described threshold value (that is, a "large load" state is provided). In Step S4 performed after a determination in Step S5 of FIG. 2 is YES, a step-down operation of the DC/DC converter 11 in the second operation mode is performed and the above-described load current larger than or equal to the threshold value is supplied from the DC/DC converter 11 to the load LD.

In the third operation mode, the control unit 12A of the control device 12 is caused to stop the step-down operation of the DC/DC converter 11. In the third operation mode, the charging rate of the low-voltage power supply LB is larger than the above-described predetermined value (that is, the voltage of the low-voltage power supply LB is recovered). In the third operation mode, the load current supplied from the DC/DC converter 11 to the load LD is less than the above-described threshold value (that is, a "small load" state is provided). In Step S7 performed after a determination in Step S5 of FIG. 2 is NO and then a determination in Step S6 is NO, the control unit 12A of the control device 12 performs control to stop the step-down operation of the DC/DC converter 11 in the third operation mode (the second control).

Although not illustrated as an operation mode in FIG. 4, in another operation mode, in Step S4 performed after a determination in Step S3 of FIG. 2 is YES (that is, a state in which a voltage of the power supply HB input to the DC/DC converter 11 is within the voltage range AR1 and is a voltage within the range of the normal working voltage in the load LD (for example, a voltage, i.e., 14.5 [V]) can be supplied from the DC/DC converter 11 to the load LD is provided), the step-down operation of the DC/DC converter 11 is performed and electric power is supplied from the DC/DC converter 11 to the load LD.

Figure 5:
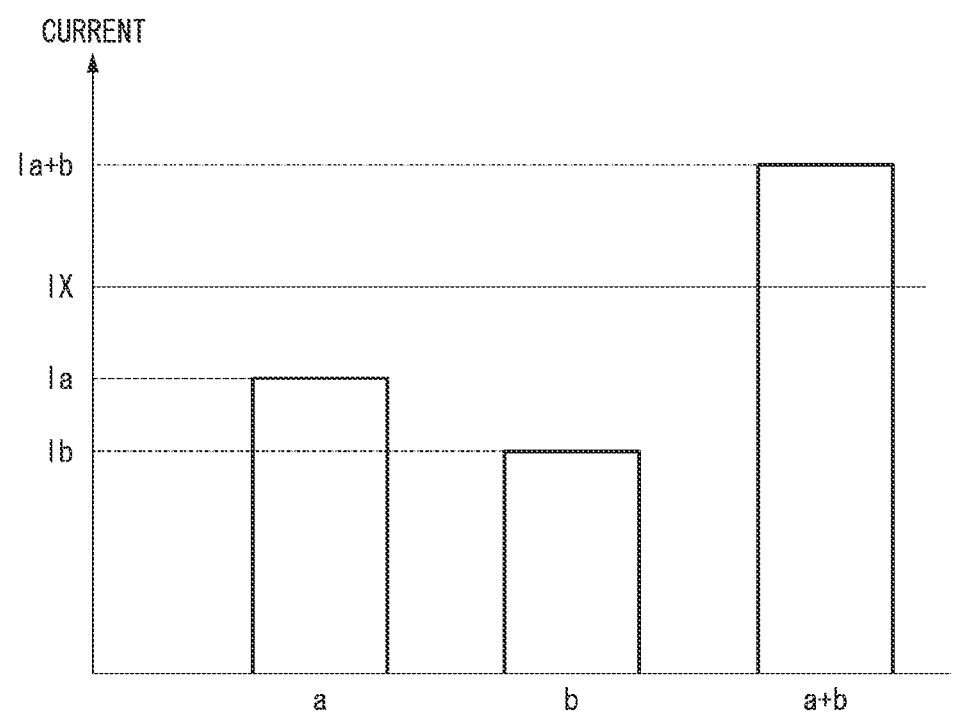

FIG. 5 is a diagram illustrating an example of a relationship between a current supplied to a load LD used all the time in a vehicle having the voltage converting device 1 in the first embodiment applied thereto, a charging current supplied from the DC/DC converter 11 to the low-voltage power supply LB when the low-voltage power supply LB of the vehicle is charged, and the like.

In FIG. 5, a vertical axis indicates a magnitude of a current and a horizontal axis indicates a type of current. To be specific, "a" indicates a current supplied to a load LD used all the time in the vehicle, "b" indicates a charging current supplied from the DC/DC converter 11 to the low-voltage power supply LB when the low-voltage power supply LB of the vehicle is charged, and "a+b" indicates a total current supplied at the same time to the load LD used all the time in the vehicle and the low-voltage power supply LB.

In the example illustrated in FIG. 5, when a current is not supplied from the DC/DC converter 11 to either the load LD or the low-voltage power supply LB, a voltage of the power supply HB input to the DC/DC converter 11 is outside of the voltage range AR1 (specifically, is within the voltage range AR2). For this reason, if the process illustrated in FIG. 2 is performed, a determination in Step S3 is NO and the step-down operation of the DC/DC converter 11 in Step S4 is not permitted.

When a current IX is supplied from the DC/DC converter 11 to either the load LD or the low-voltage power supply LB, a voltage within the range of the normal working voltage in the load LD (for example, a voltage, i.e., 14.5 [V]) can be supplied from the DC/DC converter 11 to the load LD. For this reason, if the process illustrated in FIG. 2 is performed, a determination in Step S3 is YES and the step-down operation of the DC/DC converter 11 in Step S4 is permitted.

In the example illustrated in FIG. 5, a current Ia supplied to a load LD used all the time in the vehicle is smaller than the current IX. For this reason, when the current Ia is supplied from the DC/DC converter 11 to the load LD used all the time in the vehicle, a voltage within the range of the normal working voltage in the load LD (for example, a voltage, i.e., 14.5 [V]) cannot be supplied from the DC/DC converter 11 to the load LD. That is to say, in this case, there is a concern concerning a voltage which is higher than the normal working voltage in the load LD (for example, a voltage higher than 14.5 [V]) and supplied from the DC/DC converter 11 to the load LD. As a result, if the process illustrated in FIG. 2 is performed, a determination in Step S5 is NO and the step-down operation of the DC/DC converter 11 in Step S4 is not permitted. The current Ia is supplied from the low-voltage power supply LB to the load LD used all the time in the vehicle.

A charging current Ib supplied from the DC/DC converter 11 to the low-voltage power supply LB when the low-voltage power supply LB of the vehicle is charged is also smaller than the current IX. For this reason, as shown by "b" in FIG. 5, a voltage within the range of the normal working voltage in the load LD (for example, a voltage, i.e., 14.5 [V]) cannot be supplied from the DC/DC converter 11 to the load LD simply when the charging current Ib is supplied from the DC/DC converter 11 to the low-voltage power supply LB.

On the other hand, as shown by "a+b" in FIG. 5, a current Ia+b supplied at the same time to the load LD used all the time in the vehicle and the low-voltage power supply LB is larger than the current IX. For this reason, when the current Ia+b is supplied from the DC/DC converter 11 to the load LD used all the time in the vehicle and the low-voltage power supply LB, a voltage within the range of the normal working voltage in the load LD (for example, a voltage, i.e., 14.5 [V]) can be supplied from the DC/DC converter 11 to the load LD. As a result, if the process illustrated in FIG. 2 is performed in a state in which a charging rate of the low-voltage power supply LB is less than or equal to a predetermined value, a determination in Step S6 is YES and the step-down operation of the DC/DC converter 11 in Step S4 is permitted.

Although not illustrated in FIG. 5, in a case in which the current Ia+b supplied at the same time to the load LD used all the time in the vehicle and the low-voltage power supply LB falls below the current IX, when this current Ia+b is supplied from the DC/DC converter 11 to the load LD used all the time in the vehicle and the low-voltage power supply LB, there is a concern concerning a voltage higher than the normal working voltage in the load LD (for example, a voltage higher than 14.5 [V]) supplied from the DC/DC converter 11 to the load LD. As a result, if the process illustrated in FIG. 2 is performed, a determination in Step S6 is NO. In addition, in Step S7, the step-down operation of the DC/DC converter 11 is stopped.

When the voltage converting device 1 in the first embodiment is applied to the vehicle and a lead storage battery is used as the low-voltage power supply LB, it is possible to perform charging according to a received current of the low-voltage power supply LB from the DC/DC converter 11.

That is to say, in the voltage converting device 1 in the first embodiment, the first control performed in Step S4 and the second control performed in Step S7 are switched on the basis of the load current Ia supplied to the load LD.

In the voltage converting device 1 in the first embodiment, when a load current supplied to the load LD is less than a threshold value in a state in which a determination in Step S3 of FIG. 2 is NO and an excessive capacity of the low-voltage power supply LB is provided (a state in which a charging rate is larger than a predetermined value), determinations in Step S5 and Step S6 are NO. In addition, in Step S7, the step-down operation of the DC/DC converter 11 is stopped.

If an operation state of the voltage converting device 1 changes, the capacity of the low-voltage power supply LB decreases (the charging rate is smaller than equal to the predetermined value), and a charging load increases, a determination in Step S6 is YES, the process of Step S4 is performed, and the step-down operation of the DC/DC converter 11 starts again.

In the voltage converting device 1 in the first embodiment, even if a determination in Step S3 is NO, if a determination in Step S5 or Step S6 is YES, the process of Step S4 is performed and the step-down operation of the DC/DC converter 11 is performed. That is to say, even when a voltage of the power supply HB input to the DC/DC converter 11 is within the voltage range AR2, if a determination in Step S5 or Step S6 is YES, the process of Step S4 is performed and the step-down operation of the DC/DC converter 11 is performed.

That is to say, in the voltage converting device 1 in the first embodiment, the range in which the step-down operation of the DC/DC converter 11 can be performed is expanded and the step-down operation of the DC/DC converter 11 can be performed within a wide voltage range.

Second Embodiment

A second embodiment of the voltage converting device according to the present invention will be described below.

A voltage converting device 1 in the second embodiment is constituted in the same manner as in the voltage converting device 1 in the first embodiment described above, except for the following description. Therefore, according to the voltage converting device 1 in the second embodiment, it is possible to obtain the same effect as in the voltage converting device 1 in the first embodiment described above, except for the following description.

The voltage converting device 1 in the second embodiment is constituted in the same manner as in the voltage converting device 1 in the first embodiment illustrated in FIG. 1.

As described above, in the voltage converting device 1 in the first embodiment, when it is determined in Step S3 of FIG. 2 that a voltage of the power supply HB input to a DC/DC converter 11 is within a voltage range AR1, in Step S4, the first control is performed. In addition, it is determined in Step S3 that the voltage of a power supply HB input to the DC/DC converter 11 is outside of the voltage range AR1, the process proceeds to the process of Step S5.

When it is determined in Step S3 that the voltage of a power supply HB input to the DC/DC converter 11 is within the voltage range AR1, the voltage converting device 1 in the second embodiment performs the first control in Step S4 as in the voltage converting device 1 in the first embodiment. On the other hand, when it is determined in Step S3 that the voltage of the power supply HB input to the DC/DC converter 11 is outside of the voltage range AR1, the second control is performed in Step S7 without performing Step S5 and Step S6 unlike the voltage converting device 1 in the first embodiment.

Third Embodiment

A third embodiment of the voltage converting device according to the present invention will be described below.

A voltage converting device 1 in the third embodiment is constituted in the same manner as in the voltage converting device 1 in the first embodiment described above, except for the following description. Therefore, according to the voltage converting device 1 in the third embodiment, it is possible to obtain the same effect as in the voltage converting device 1 in the first embodiment described above, except for the following description.

The voltage converting device 1 in the third embodiment is constituted in the same manner as in the voltage converting device 1 in the first embodiment illustrated in FIG. 1.

As described above, the voltage converting device 1 in the first embodiment performs second control in Step S7 when it is determined in Step S3 that a voltage of a power supply HB input to a DC/DC converter 11 is outside of a voltage range AR1, it is determined in Step S5 that a load current supplied from the DC/DC converter 11 to a load LD is less than a threshold value and a first condition which is a condition in which a voltage supplied from the DC/DC converter 11 to the load LD is not a voltage higher than a normal working voltage in the load LD is not satisfied, and then it is determined in Step S6 that a charging rate of a low-voltage power supply LB is larger than a predetermined value.

The voltage converting device 1 in the first embodiment performs first control in Step S4 when it is determined in Step S3 that a voltage of a power supply HB input to the DC/DC converter 11 is outside of a voltage range AR1 and then it is determined in Step S5 that a load current supplied from the DC/DC converter 11 to a load LD is larger than or equal to a threshold value and the first condition which is a condition in which a voltage supplied from the DC/DC converter 11 to the load LD is not a voltage higher than a normal working voltage in the load LD is satisfied.

On the other hand, the voltage converting device 1 in the third embodiment performs second control in Step S7 when it is determined in Step S3 that the voltage of the power supply HB input to the DC/DC converter 11 is outside of the voltage range AR1 and then it is determined in Step S6 that a charging rate of a low-voltage power supply LB is larger than a predetermined value without performing Step S5.

The embodiments of the present invention are presented as examples and are not intended to limit the scope of the present invention. These embodiments are implemented in various other forms and various omissions, replacements, and changes are possible without departing from the gist of the present invention. These embodiments and modifications thereof are included in the scope and the gist of the present invention and in the scope of the invention described in the claims and the equivalent scope thereof.

What is claimed is:

1. A voltage converting device, comprising:
a DC/DC converter configured to step down a voltage of a power supply and output the stepped-down voltage to a low-voltage power supply having a voltage lower than a voltage of the power supply;
a control device configured to control the DC/DC converter; and
a determining unit configured to determine whether a voltage of the power supply input to the DC/DC converter is within a predetermined voltage range,
wherein the control device switches, on the basis of at least a determination result of the determining unit, between a first control in which the DC/DC converter is caused to perform a step-down operation and electric power is supplied to a load connected to the low-voltage power supply and a second control in which a step-down operation of the DC/DC converter stops and electric power is supplied from the low-voltage power supply to the load, and wherein the control device performs the first control and performs charging of the low-voltage power supply when the determining unit determines that the voltage of the power supply is outside of the predetermined voltage range and when a charging rate of the low-voltage power supply is less than or equal to a predetermined value, and the control device performs the second control when the determining unit determines that the voltage of the power supply is outside of the predetermined voltage range and when the charging rate of the low-voltage power supply is larger than the predetermined value.

2. The voltage converting device according to claim 1, wherein the control device performs the first control when the determining unit determines that the voltage of the power supply is within the predetermined voltage range, and performs the second control when the determining unit determines that the voltage of the power supply is outside of the predetermined voltage range.

3. A voltage converting device, comprising:

a DC/DC converter configured to step down a voltage of a power supply and output the stepped-down voltage to a low-voltage power supply having a voltage lower than a voltage of the power supply;

a control device configured to control the DC/DC converter; and a determining unit configured to determine whether a voltage of the power supply input to the DC/DC converter is within a predetermined voltage range, wherein the control device switches, on the basis of at least a determination result of the determining unit, between a first control in which the DC/DC converter is caused to perform a step-down operation and electric power is supplied to a load connected to the low-voltage power supply and a second control in which a step-down operation of the DC/DC converter stops and electric power is supplied from the low-voltage power supply to the load, the voltage converting device further comprising the load connected to the low-voltage power supply, wherein the control device switches between the first control and the second control on the basis of a load current supplied to the load, wherein the control device performs the first control, even when it is determined that the voltage of the power supply input to the DC/DC converter is outside of the predetermined voltage range, when the load current supplied to the load is larger than or equal to a threshold value, and wherein the control device performs the second control when the voltage of the power supply input to the DC/DC converter is outside of the predetermined voltage range and when a load current supplied to the load is less than the threshold value and a charging rate of the low-voltage power supply is larger than a predetermined value.

4. The voltage converting device according to claim 3, wherein the control device does not perform the first control when a charging rate of the power supply is less than a specified value.

5. The voltage converting device according to claim 4, wherein a case in which the charging rate of the power supply is less than the specified value includes a case in which the charging rate of the power supply is less than the specified value if the DC/DC converter is caused to perform a step-down operation and electric power output from the DC/DC converter is supplied to the load.

6. The voltage converting device according to claim 4, wherein a case in which the charging rate of the power supply is less than the specified value includes a case in which the charging rate of the power supply is less than the specified value if the DC/DC converter is caused to perform a step-down operation and electric power output from the DC/DC converter is supplied to the low-voltage power supply.

7. The voltage converting device according to claim 5, wherein a case in which the charging rate of the power supply is less than the specified value includes a case in which the charging rate of the power supply is less than the specified value if the DC/DC converter is caused to perform a step-down operation and electric power output from the DC/DC converter is supplied to the low-voltage power supply.

8. The voltage converting device according to claim 3, wherein the control device performs the first control when the determining unit determines that the voltage of the power supply is within the predetermined voltage range, and performs the second control when the determining unit determines that the voltage of the power supply is outside of the predetermined voltage range.

* * * * *